United States Patent Office 3,447,619
Patented June 3, 1969

3,447,619
TRANSMISSION FOR FOUR-TRACKED VEHICLES
William Bruce Nodwell and John H. Nodwell, Calgary, Alberta, Canada, assignors, by mesne assignments, to Flex-Track Equipment Ltd., Calgary, Alberta, Canada, a company of Alberta
Filed Dec. 5, 1966, Ser. No. 599,304
Int. Cl. B62d 55/08, 11/06
U.S. Cl. 180—9.46     6 Claims

ABSTRACT OF THE DISCLOSURE

In a vehicle having relatively angularly displaceable front and rear bogies, a drive train is provided which includes an internal combustion engine, a mechanical drive to the rear bogie, and a hydrostatic drive to the front bogie. Means responsive to angular displacement of the front and rear bogies and operable on the hydrostatic drive are provided to increase the speed of the front bogie during turns.

---

This invention relates to a drive train for a vehicle having front and rear bogies bearing driven terrain engaging surfaces. The invention is particularly adapted for tracked vehicles having front and rear sets of endless tracks mounted on front and rear bogies, the front driven bogie being steered.

Heretofore vehicles have had the front and rear bogies driven by separate internal combustion engines. This has necessitated the starting of not one but two engines before the vehicle could become operable and frequently, for example under Artic conditions, a vehicle has been inoperable because only one of the engines could be started.

A further disadvantage of prior proposals has been that the engine speeds have to be carefully arranged so that the front and rear bogies are driven at the same speed when in straight motion and furthermore that when turning, the leading bogie is driven at a different speed than the trailing bogies to accommodate for the greater distance travelled by the leading bogie during turns.

The present invention avoids the disadvantages inherent in the operation of two motor vehicles by providing a power train which can drive both front and rear bogies from a single internal combustion engine.

According to the present invention a transmission for a vehicle having front and rear bogies bearing terrain engaging surfaces comprises an internal combustion engine; a transmission means and mechanical driving connections from the internal combustion engine to the rear bogie; a fluid pump driven by the internal combustion engine; fluid motor adapted to drive the front bogie; and fluid connections between the fluid pump and the fluid motor, means being provided, responsive to the angle between the front and rear bogies, when the vehicle is turning and operable to control the delivery of fluid to the front bogie to accommodate for the speed differential between bogies due to the turn.

Conveniently the means responsive to the angle between the front and rear bogies may be a mechanical linkage connected to the front bogie and adapted to control the speed of the fluid pump whereby to vary the quantity of delivered fluid to the fluid motor.

The following is a description by way of example of certain embodiments of the present invention, reference being had to the accompanying drawings in which.

Figure 1:
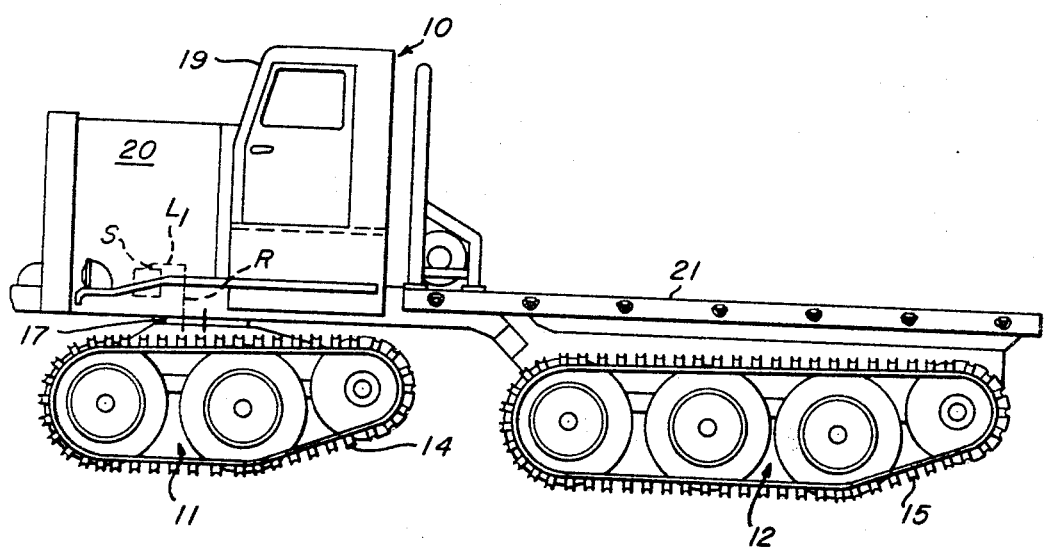
FIGURE 1 is an elevation of vehicle having front and rear bogies bearing driven endless tracks.
Figure 2:
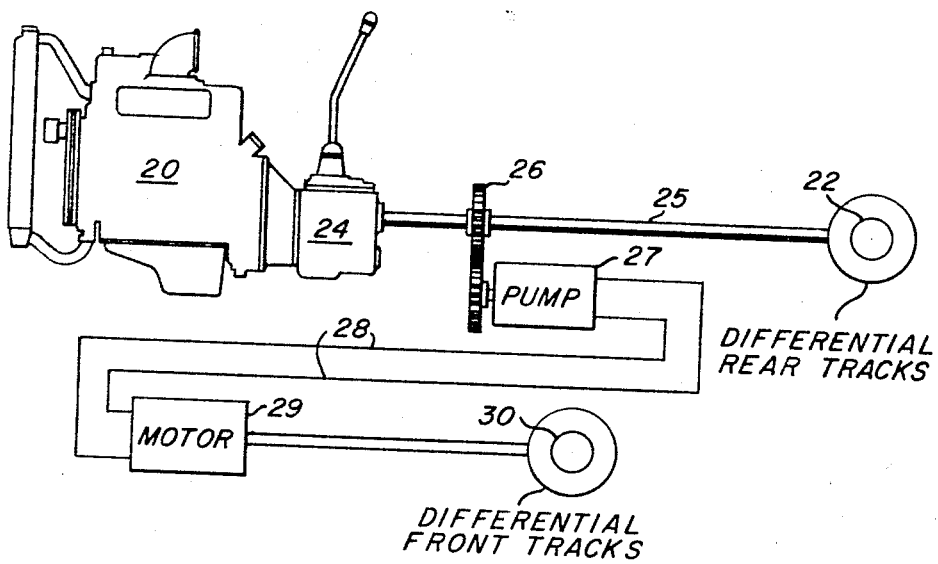
FIGURE 2 is a schematic representation of a power train.

Referring now to the drawings:

In FIGURE 1 a vehicle 10 has beneath its chassis a front drive bogie 11 and a rear drive bogie 12 each carrying two pairs of endless tracks 14, 15. The front bogie is pivotally mounted for steering movement at 17 and the rear bogie 12 is fixed. The front bogie carries the drive cab 19 and the engine 20 and the rear bogie 12 bears the main load of a load carrying chassis 21.

The engine 20 drives the differential 22 of the rear bogie 12 through a transmission 24 which in this embodiment is a standard gear box and clutch, and mechanical drive shaft connection 25.

Mounted on the shaft 25 is gearing 26 which drives a hydraulic pump 27. The hydraulic pump is connected by hydraulic connections 28 with a hydraulic motor 29 which drives the differential 30 of the front bogie 11.

The gearing 26 is such that the pump 27 drives the differential 30 at exactly the same speed as the differential 22 when vehicle is in straight line motion.

In a preferred embodiment of the present invention the further improvement is provided that the front bogie 11 may be driven at a controlled variable speed relative to the rear bogie 12. This is accomplished by providing a means responsive to the angle between the front and rear bogies and which controls the delivery of the hydraulic fluid to the hydraulic motor 29.

Figures 3, 4:
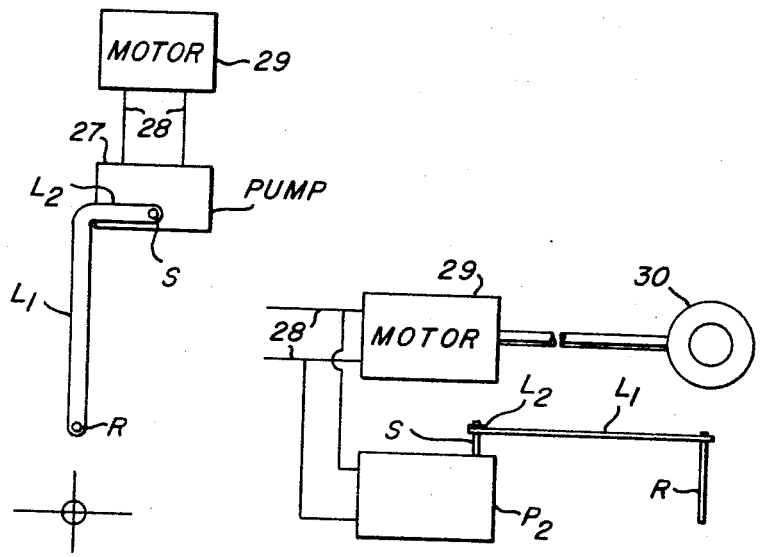
FIGURE 3 is a schematic indication of the linkage from the first bogie to the hydraulic pump.
FIGURE 4 is a schematic part view of a second and variable pump in parallel with the first and mechanically connected to respond to the relative angular positions of front and rear bogies.

As will be clear this variable drive may be accomplished in a number of fashions, two of which are shown. In the first arrangement (FIGURES 1 and 3) a rod R extends upwardly from the front bogie 11 to which it is attached and is connected by links $L_1$ and $L_2$ to a pump control shaft S. The pump control shaft S may vary the pump delivery by manifolding. Thus, as the front bogie is turned relative to the rear bogie and therefore relative to the chassis, the rod R is turned, as it is mounted eccentrically on the bogie 11, and through links $L_1$ and $L_2$ the shaft S is pivoted to control the delivery.

In an alternative arrangement where the pump 27 is of a constant delivery type an auxiliary variable pump P2 (FIGURE 4) is provided in parallel with the pump 27 and here the linkage R, $L_1$, $L_2$ and S operate on the pump P2 to cause it to operate and augment the delivery of the pump 27 to the motor 29 thereby increasing the speed of the front bogie.

Figure 5:
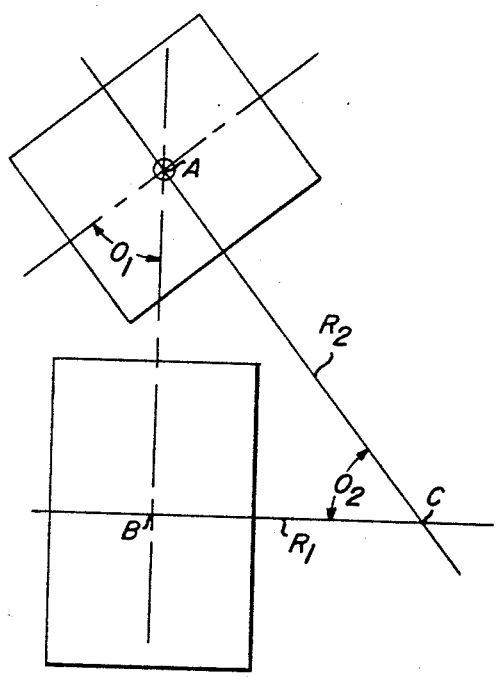
FIGURE 5 is a diagrammatic geometrical representation to indicate the manner in which the drives of the front and rear bogies vary according to the angular displacement between bogies when the vehicle is turning.

FIGURE 5 shows the relationship of the speeds between the front and the rear bogies in a forward turn and thus the ratio of the driving speeds of the front and rear bogies. It will be seen that $0_1$, the angle between the front and rear bogies equals $0_2$.

When the machine has turned so that the front unit 11 is disposed with its center line at an angle 0, to the center line of rear unit 12.

With the center of pivot of the front unit 11 being at A and the center of the rear unit being at B.

Therefore, in order for the machine to turn about turning point C with no front or rear track slippage.

Angle ACB is $0_2$

Front unit turns about C with radius $R_2$

Rear unit turns, about C also, with radius $R_1$.

Now, if machine goes around in a complete circle, the point A on the front unit travels $C_2 = 2\pi R_2$, while the point B on the rear units travels $C_1=2\pi R_1$ where $C_2$ and $C_1$, are respectively the circumferential distance traveled by the points A and B.

Therefore when the machine has traveled in a complete circle, ratio of the distances which the front and rear units travel is $$\frac{C_2}{C_1} \text{ or } \frac{R_2}{R_1}$$

From triangle ABC, $R_1 = R_2 \cos 0_2$ or $$\frac{R_2}{R_1} = \frac{1}{0_2}$$

Therefore, front unit must go $1/\cos 0_2$ times as fast as the rear unit. If volume pumped when machine is traveling straight ahead is $Q_1$ then volume pumped when machine is travelling at angle is $Q_1/\cos 0_2$ and increases in volume pumped will be $$Q_1\left(\frac{1}{\cos 0_2} - 1\right)$$

What we claim as our invention is:

1. In a vehicle having driven relatively angularly displaceable front and rear bogies bearing terrain engaging surfaces, a drive train comprising in combination: an internal combustion engine; a mechanical driving connection from the internal combustion engine to the rear bogie; fluid driving means for the front bogie comprising a fluid pump driven by the internal combustion engine, a fluid motor adapted to drive the front bogie, fluid connections between said fluid pump and said fluid motor; and means responsive to relative angular displacement between the front and rear bogies, said means being connected to said fluid driving means and adapted to control the delivery of fluid to said fluid motor whereby a speed differential related to said angular displacement is induced between the rear bogie and the front bogie.

2. A vehicle as claimed in claim 1 wherein said fluid pump is a variable delivery fluid pump and the means responsive to relative angular displacement is connected to said fluid pump to control the fluid delivery thereof to said fluid motor.

3. A vehicle as claimed in claim 2 wherein said means responsive to angular displacement between the front and rear bogies includes a linkage actuating a pump control shaft.

4. The vehicle of claim 1 wherein there is provided a frame, the rear bogie is laterally fixed with reference to the frame, the front bogie is laterally pivotable on the frame, the internal combustion engine is mounted on the frame, and the front and rear bogies each carry a pair of laterally spaced endless track means.

5. In a vehicle having driven relatively angularly displaceable front and rear bogies, a drive train comprising in combination: an internal combustion engine; a mechanical driving connection from the internal combustion engine to the rear bogie; fluid driving means for the front bogie comprising a constant delivery fluid pump driven by the internal combustion engine, a fluid motor adapted to drive the front bogie, fluid connections between said constant delivery fluid pump and said fluid motor, a variable delivery fluid pump connected to said connections in parallel with said constant delivery pump; and means responsive to relative angular displacement between the front and rear bogies, said responsive means being connected to said fluid driving means and adapted to control the delivery of fluid to said fluid motor, whereby a speed differential related to said angular displacement is induced between the rear bogie and the front bogie.

6. A vehicle as claimed in claim 5 wherein said responsive means comprises a linkage connected between said front bogie and said variable delivery pump, whereby, when the front bogie turns relative to the rear bogie, the variable delivery pump is actuated to provide an increased total volume of fluid delivered to said motor to induce said speed differential.

References Cited

UNITED STATES PATENTS

| | | | |
|---|---|---|---|
| 2,878,883 | 3/1959 | France et al. | |
| 3,151,694 | 10/1964 | Rodgers | 180—66 X |
| 3,265,146 | 8/1966 | Tucker | 180—50 X |
| 3,354,978 | 11/1967 | Budzich | 180—44 |
| 3,361,223 | 1/1968 | Bauer | 180—44 |

A. HARRY LEVY, *Primary Examiner.*

U.S. Cl. X.R.

180—49, 66